*INVENTOR.*
BRUCE E. SCOTT
BY Raymond P. Wallace
AGENT

United States Patent Office 3,623,205
Patented Nov. 30, 1971

3,623,205
COMPOSITE BEARING STRUCTURE
Bruce E. Scott, Wyckoff, N.J., assignor to
Curtiss-Wright Corporation
Filed Dec. 24, 1969, Ser. No. 888,017
Int. Cl. B32b 15/18
U.S. Cl. 29—196                                      7 Claims

ABSTRACT OF THE DISCLOSURE

A journal bearing structure in which a base metal member has a silver heat-conducting and fatigue-resistant intermediate layer and a bearing surface of lead-tin alloy, with a pure tin barrier layer between the lead-tin alloy and the silver to control diffusion and migration of the tin from the alloy in order to maintain corrosion resistance of the bearing surface.

BACKGROUND OF THE INVENTION

This invention relates to bearings, and more particularly, to bearings for the journal of a rotatable shaft. The invention herein described was made in the course of a contract with the Department of the Air Force.

Bearings are known in which a substrate, generally steel, is provided with an overlay surface material having good bearing quality, such as babbitt, bronze, lead-tin, or copper-lead-tin. It is also known to provide a nonferrous intermediate layer of good heat-conducting material between the bearing metal and the substrate, the intermediate layer often being of copper or silver or their alloys. A bearing surface having a high proportion of lead is preferred because of its good dry-lubricating properties, but lead is very susceptible to corrosion by hot lubricating oils. Corrosion resistance can be markedly improved by the addition of a proportion of tin to the lead, but after a period of service the tin of the lead-tin alloy diffuses from the overlay into the metal of the intermediate layer, depleting the tin content of the bearing surface and resulting in its corrosion and failure of the bearing.

There have been attempts to solve this problem, but none entirely satisfactory. One such is disclosed in U.S. Pat. 2,459,172, in which on a steel substrate with a copper-lead intermediate layer containing about 0.5% of tin there is provided a bearing surface principally of lead, but with about 12% tin and 3% copper. Between the bearing material and the intermediate layer there is positioned a barrier layer or flash of iron, nickel, or cobalt, to which tin does not readily diffuse. This expedient is unsatisfactory for two reasons. First, with such a high proportion of tin in the bearing surface the melting point of the overlay is reduced so that in severe service the bearing material tends to smear and gall. Second, if the bearing surface is worn through, there is then presented to the journal the hard metal of the barrier, nickel, iron, or cobalt, which may readily cause damage. Further, it is difficult to electroplate such barrier metals on to the intermediate layer, which is often quite porous.

Pat. No. 2,635,020 discloses a similar attempt to solve the problem. This patent uses a steel substrate, an intermediate layer of 24% lead and 76% copper, a brass barrier layer, and an overlay of 10% tin and 90% lead. Here again, although the brass barrier provides some protection against diffusion, its copper content attracts some diffusion of the tin from the bearing overlay. Further, if the bearing material wears through to the barrier layer, the brass is harder than is desirable, and it also forms deleterious intermetallic compounds with the other components, which may damage the journal.

It will be seen from the foregoing that the problem of tin diffusion from the bearing surface has been reccognized by the prior art and that attempts have been made to solve it, but that such attempts have not given altogether satisfactory results. The present invention overcomes the problem of depletion of tin from the overlay and avoids the introduction of a hard-metal barrier which if exposed would damage the journal.

SUMMARY

This invention establishes the cause and mechanism of tin diffusion and migration in bearing materials, in that tin has been found to have relatively low solubility in lead but a high rate of diffusion therein, and high solubility in silver but a relatively low diffusion rate therein. Therefore, in a bearing having a lead-tin overlay on a silver intermediate layer a gradient of tin diffusion toward the silver is established with successive depletion of tin from the bearing surface as the tin becomes fixed in solid solution in the silver. This invention provides a bearing structure in which a flash of pure tin is disposed on the surface of the silver intermediate layer before application of the lead-tin overlay. The tin flash satisfies the affinity of the silver for tin, providing a tin-rich zone in solid solution at the surface of the silver which remains at the surface of the interface because of the low diffusion of tin in silver, thereby providing an effective barrier against diffusion of tin from the overlay bearing material. Further, if the bearing surface becomes worn or corroded sufficiently to expose the tin barrier layer there is less likelihood of damage to the journal, since pure tin has reasonably good bearing qualities and is not hard or abrasive. Also, there is established the optimum range of proportion for lead and tin in the bearing surface.

It is an object of this invention to provide a bearing structure having high corrosion resistance and long wearing qualities.

It is another object to provide a bearing structure in which diffusion of tin from a lead-tin bearing surface is substantially diminished.

Other objects and advantages will become apparent on reading the following specification in connection with the accompanying drawings.

DESCRIPTION OF THE PREFERRED EMBODIMENT

Figure 1:
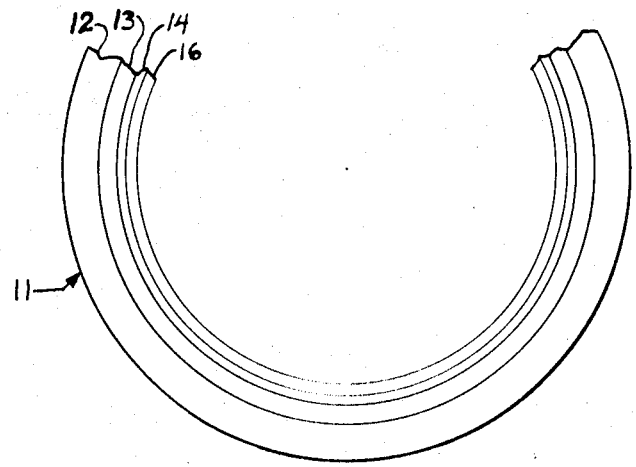
FIG. 1 is a semischematic fragmentary view of a journal bearing according to the invention.
Figure 2:
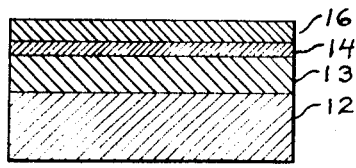
FIG. 2 is a schematic representation of a cross-section through a journal bearing according to the invention.

FIG. 1 shows a fragmentary representation in elevation of a journal bearing designated generally as 11. A structural base member 12 is provided, of steel or other appropriate material, and having a bore sized in accordance with its intended use. An intermediate heat-conducting and fatigue-resistant layer 13 of silver is deposited on the inner surface of the base member, preferably by electroplating. The thickness of the silver intermediate layer will be chosen in accordance with the amount of heat transfer expected, and also in accordance with the necessary fatigue resistance in view of the service to which the bearing will be subjected. Suuch thicknesses will therefore vary from one type of bearing to another. For uses where loads are low but fatigue resistance is desired, the silver thickness may range from about .002" to about .016", with the optimum for a particular design being dependent on the design load on the bearing. For highly loaded aircraft uses, such as the master rod bearing of an aircraft engine of high horsepower output, the silver thickness ranges from about .015" to about .030", with an optimum of about 020".

There is then deposited on top of the intermediate layer a barrier layer 14 comprising a flash of pure tin. The tin barrier layer may be very thin, because although tin has a relatively high solubility rate in silver, its diffusion rate therein is very low. Hence, a very small amount of tin will satisfy the affinity of silver for tin, which progressively dissolves into the silver but remains at the surface, providing an effective barrier against the loss of tin from the lead-tin alloy of the bearing surface by diffusion of tin therefrom. Therefore, a tin barrier layer from about .00001" to about .0001" in thickness is sufficient, with about .00008" being generally a normal thickness. On top of the barrier layer there is then deposited the bearing material 16 of lead-tin alloy, of a thickness compatible with the expected conditions of service, normally in the neighborhood of about .001", but varying as required, from about .0005" to about .002".

The proportion of tin in the bearing alloy can range from about 6% to about 10% for high quality bearings such as are used in aircraft, with an optimum amount of about 8%. When the tin content of the bearing alloy drops below about 6% the property of corrosion resistance is rapidly lost, so that bearing distress from corrosion-erosion soon results. When the tin content rises above about 10% the melting point of the eutectic is lowered, so that smearing of the bearings occurs at high service temperatures. However, for automotive practices and like uses the tin content may be as high as 14–15%, since conditions in such service are not so rigorous and temperatures are unlikely to rise so high as in aircraft use.

Figure 3:
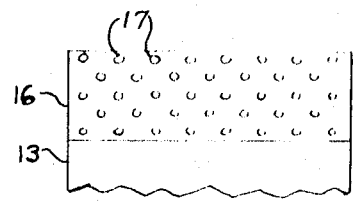
FIG. 3 is a schematic representation of a lead-tin overlay deposited directly onto a silver intermediate layer, and before diffusion.
Figure 4:
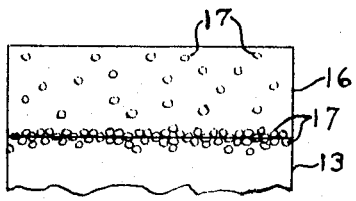
FIG. 4 is a schematic of FIG. 3 after some diffusion occurs.

FIGS. 3 and 4 show a schematic representation of the process of tin migration from a lead-tin bearing material deposited directly onto a silver intermediate layer without a barrier layer. In FIG. 3 the bearing alloy 16 is shown as freshly deposited on the silver 13, with atoms 17 of tin evenly distributed in solution in the lead. FIG. 4 shows the same structure after a period of service. A large number of the tin atoms from the bearing alloy have diffused through the lead and migrated to the interface between the silver and the bearing material, where they enter into solution in the silver, remaining in the region of the interface because the diffusion rate of tin in silver is low.

Figure 5:
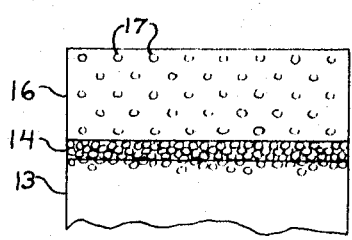
FIG. 5 is a schematic of a lead-tin overlay deposited on a tin flash on a silver intermediate layer, according to the invention.

FIG. 5 shows a corresponding schematic representation of the situation in a bearing constructed according to the invention. An intermediate layer of silver 13 has deposited on it a barrier layer 14 of tin. Some of the tin atoms from the barrier layer dissolve in the silver, making the interface between the silver and the tin less distinct than when first laid down. However, the tin atoms at the interface do not migrate deeply into the silver, again owing to the low diffusion rate of tin therein, and therefore the tin concentration at the interface remains high. Hence, there is not diffusion of tin atoms from the bearing material 16, which retains its corrosion resistance and good bearing qualities.

Testing has established the superiority of bearings made according to the invention with a tin strike on top of the silver intermediate layer, over similar bearings made without such a tin strike. Test panels were made up in the form of bearing structures of the two kinds, with and without the tin strike. These were rotated in hot oil meeting the military specification MIL-L-6082, Grade 1100, with 1% of oleic acid added. The addition of the oleic acid approximates the condition of such oil after a period of use, and if the bearing overlay is subject to chemical corrosion by reason of the depletion of tin therefrom the lead gradually forms lead oleates and other lead soaps. Such chemical corrosion then promotes mechanical erosion and galling. The samples were rotated in the test oil at a temperature of 325° F. plus or minus 5° for two periods of 16 hours each. Table I gives the weight loss in milligrams per square centimeter of exposed bearing surface, in the samples not having a tin barrier strike. Table II shows the corresponding measurements of the samples having the tin barrier.

TABLE I.—LEAD-TIN BEARING OVERLAYS ON SILVER INTERMEDIATE LAYER

| Percent tin in bearing layer | Weight loss, mgm./sq. cm. | | Total weight loss, 32 hrs. |
|---|---|---|---|
| | 1st 16 hrs. | 2d 16 hrs. | |
| 4.2 | 4.17 | 4.95 | 9.12 |
| 6.6 | 4.65 | 5.46 | 10.11 |
| 8.7 | 3.32 | 3.61 | 6.93 |
| 11.6 | 5.27 | 5.07 | 10.34 |

TABLE II.—LEAD-TIN BEARING OVERLAYS ON TIN BARRIER OVER SILVER INTERMEDIATE LAYER

| Percent tin in bearing layer | Weight loss, mgm./sq. cm. | | Total weight loss, 32 hrs. |
|---|---|---|---|
| | 1st 16 hrs. | 2d 16 hrs. | |
| 5.0 | .00 | .047 | .047 |
| 5.9 | .00 | .00 | .00 |
| 8.1 | .00 | .078 | .078 |
| 10.0 | .093 | .20 | .293 |

The tin contents of the samples in Table II are not precisely the same as those of the samples of Table I, owing to a certain imprecision in controlling the plating-out rates of the two components of the alloy. However, the two sets of samples are reasonably comparable in tin contents. It will be seen from Table II that where the tin barrier strike was employed over the silver intermediate layer the weight loss from the bearing material was markedly less than when no tin barrier was used.

Further, chemical analysis and photomicrographs of the samples having no tin barrier showed a loss of tin from the bearing material and a tin-rich zone at the surface of the silver, caused by diffusion of tin from the lead-tin alloy. Similar analysis and photomicrographs of the samples having a tin barrier showed no measurable loss of tin from the lead-tin bearing alloy. Subsequent running of bearings in actual service conditions confirms these results.

It is therefore apparent that providing a tin barrier between the lead-tin bearing material and the silver heat-transferring and fatigue-resisting intermediate layer positioned on the base material results in a superior bearing structure, having high corrosion-erosion resistance and longer life. In addition, if the actual bearing surface should fail there is presented to the journal a certain thickness of tin with silver under it, either of which materials have better bearing qualities than the barriers of the prior art, such as brass, nickel, cobalt, or other hard metals, or metals which form undesirable inter-metallic compounds with the silver.

What is claimed is:

1. A bearing structure comprising a steel substrate, an intermediate heat-conducting and fatigue-resistant layer of silver on the substrate and bonded thereto, a tin barrier layer on the intermediate layer and bonded thereto, and a bearing layer of lead-tin alloy on the tin barrier layer and bonded thereto.

2. The combination recited in claim 1, wherein the bearing layer consists of an alloy containing from about 6% to about 15% tin and the remainder lead.

3. The combination recited in claim 2, wherein the bearing layer consists of about 8% tin and the remainder lead.

4. The combination recited in claim 1, wherein the silver intermediate layer is from about .002" to about .030" in thickness, the tin barrier layer is from about .00001" to about .0001" in thickness; and the lead-tin bearing layer is from about .0005" to about .002" in thickness.

5. The combination recited in claim 4, wherein the silver intermediate layer is about .020" thick, the tin barrier layer is about .00008" thick, and the lead-tin bearing layer is about .001" thick.

6. The combination recited in claim 1, wherein the silver heat-conducting and fatigue-resistant layer is from about .002" to about .030" in thickness, the tin layer is from about .00001" to about .0001" in thickness and bars the diffusion of tin from the lead-tin bearing layer to the silver intermediate layer, and the bearing layer is from about .0005" to about .002" in thickness and consists of an alloy containing from about 6% to about 15% tin and the remainder lead.

7. The combination recited in claim 6, wherein the silver intermediate layer is about .020" thick, the tin barrier layer is about .00008" thick, and the lead-tin bearing layer is about .001" thick and contains about 8% tin.

References Cited

UNITED STATES PATENTS

| | | |
|---|---|---|
| 2,459,172 | 1/1949 | Luetkemeyer et al. __ 29—196.3 |
| 2,520,310 | 8/1950 | Frazier et al. _____ 29—196 |
| 2,525,887 | 10/1950 | Frazier et al. _____ 29—196.3 |
| 2,531,910 | 11/1950 | Hensel et al. _____ 29—196 X |
| 2,547,465 | 4/1951 | Heintz et al. _____ 29—196 X |
| 2,605,149 | 7/1952 | Schaefer et al. _____ 29—196 X |
| 2,635,020 | 4/1953 | Beebe _____ 29—196.3 |
| 3,403,010 | 9/1968 | Mac Donald et al. _ 29—196.3 X |

L. DEWAYNE RUTLEDGE, Primary Examiner

E. L. WEISE, Assistant Examiner

U.S. Cl. X.R.

29—199; 308—237 R